United States Patent Office 3,052,638
Patented Sept. 4, 1962

3,052,638
PREPARATION OF RECALCINED ZINC
SULFIDE PHOSPHORS
Robert Ellis Wayrynen, Little Silver, N.J., assignor to
E. I. du Pont de Nemours and Company, Wilmington,
Del., a corporation of Delaware
No Drawing. Filed Dec. 18, 1958, Ser. No. 781,196
5 Claims. (Cl. 252—301.6)

This invention relates to a method for improving the properties of luminescent materials. More particularly, it relates to a method for improving body color and luminesence of metal-activated zinc sulfide phosphors and the products obtained thereby.

Zinc sulfide phosphors are prepared by mixing pure zinc sulfide with one or more activators such as silver, copper, and manganese, and a flux which is usually a halide. The activators are usually added as compounds of the metal, and the flux is usually a halide of an alkali metal, alkaline earth metal, or zinc. The mixture is thoroughly blended and then fired or calcined at a temperature between about 700° C. and 1300° C. After firing, the flux and other soluble materials must be dissolved away leaving the phosphor.

The body color of the phosphor tends to become darkened by the presence of activator not incorporated into the sulfide lattice. This darkening frequently becomes more pronounced when the fired phosphor is washed, probably because some of the unused activator is present as the halide after firing and precipitates as the sulfide during washing. This darkened body color reduces the utility of these phosphors in such applications as cathode ray tubes, luminescent panels, etc., because it decreases the emission brightness and spoils the appearance. In the past these phosphors have been washed with solutions of cyanide, acid thiosulfate or thiourea (see assignee's Umberger et al. application Ser. No. 686,279, filed September 26, 1957, now U.S. Patent No. 2,980,626), or acid to remove the surface discoloration. These procedures may give rise to varied amounts of activator incorporated in the lattice with resultant undesirable variations in emission color, e.g., in the case of zinc sulfide phosphors activated with relatively large amounts of silver, such as are used in black-and-white and color television tubes.

An object of this invention is to provide a method for improving the properties of zinc sulfide phosphors. Another object is to provide a method for improving the body color and luminescence of metal-activated zinc sulfide phosphors. A further object is to provide metal-activated zinc sulfide phosphors with improved body color and luminescence. Other objects will appear hereinafter.

These and other objects are accomplished by the following invention which is a method for improving the properties of metal-activated zinc sulfide phosphor particles having been previously made by calcining the zinc sulfide and activating metal compound in the presence of a halide flux, which comprises washing the calcined phosphor particles with an aqueous solution and re-calcining the washed particles at a temperature from about 500° C. to 1300° C. for a period of from 2 to 1200 minutes.

It has been found that body color and luminescence of zinc sulfide phosphors can be improved by the use of the recalcining procedure of this invention. The recalcining step incorporates excess activator into the phosphor lattice which results in zinc sulfide phosphors containing large amounts of activator, e.g. silver, and which exhibit the improvements described above. Since the phosphors are essentially washed free of flux before recalcining, excessive particle size growth and over-firing do not occur.

In a preferred method of operation, a mixture of zinc sulfide, one or more of the activators, silver, copper, and manganese compounds, preferably silver, and a halide flux, are calcined and the resulting metal-activated phosphors are washed free of flux with an aqueous solution. The washed particles are dried and may be sieved. The phosphor powders are then recalcined for from about 2 to 60 minutes, preferably about 45 minutes at a temperature range of from about 500° to 1000° C., preferably about 900° C. and in an inert atmosphere, e.g., nitrogen. An inert atmosphere is not necessary, however, when larger quantities of phosphors are prepared. The phosphors may then be sieved and are ready for use.

EXAMPLE I

A blue-emitting phosphor was prepared by calcining at 1050° C. for 1 hour a mixture of pure phosphor grade ZnS (essentially free of metals) with 9.2% $BaCl_2$, 3.5% $MgCl_2$, and $AgNO_3$ equivalent to 0.0285% Ag, all by weight. The salts were added to the ZnS as aqueous solutions and the mixture dried, blended, and calcined at a temperature of 1050° C. for 60 minutes. After calcination, the phosphor was washed by slurrying with 0.12 N HCl, filtered, and then washed on the filter with pure water, dilute aqueous $Ba(OH)_2$ and again with water. It was then dried and sieved through a 325-mesh screen. The resultant phosphor emitted blue luminescence and had a light gray body color. Portions of this phosphor were placed in boats in a tube furnace, at room temperature, through which nitrogen was flowing at 400 cc./min. The furnace was heated and held at the desired temperature for 45 minutes and after cooling, the sample was removed. The body color of the recalcined phosphors was measured in terms of percent reflectance at 450 m$\mu$ and the luminescence excited by 365 m$\mu$ radiation measured in arbitrary units. The results obtained together with the recalcination temperatures, are shown in Table 1.

Table 1

| Recalcination Temperature, ° C. | Reflectance at 450 m$\mu$, percent | Relative Luminescence |
|---|---|---|
| None | 69.4 | 100 |
| 500 | 74.0 | 104 |
| 600 | 86.6 | 135 |
| 700 | 95.0 | 158 |
| 800 | 95.4 | 162 |
| 900 | 97.0 | 169 |
| 1,000 | 94.0 | 166 |

The recalcination greatly increased the photoluminescence and changed the body color from light gray to white as indicated in the table.

EXAMPLE II

Samples of a blue-emitting phosphor with light gray body color prepared as described in Example I were put in boats and heated in a tube furnace held at 900° C. and through which nitrogen was flowing. The boats were kept in the furnace for various periods of time. The reflectance at 450 m$\mu$ and the relative photoluminescence of the phosphors are given in Table 2.

Table 2

| Recalcination Time at 900° C. (min.) | Reflectance at 450 m$\mu$, percent | Relative Luminescence |
|---|---|---|
| 0 | 69.8 | 100 |
| 1 | 69.0 | 94 |
| 2 | 80.5 | 115 |
| 5 | 92.4 | 130 |
| 10 | 92.2 | 130 |

The beneficial effect of the recalcining becomes appreciable after only two minutes.

EXAMPLE III

Pure zinc sulfide of phosphor grade as described in Example I was slurried with aqueous solutions of $BaCl_2$, $MgCl_2$, and $AgNO_3$ equivalent to 9.2% $BaCl_2$, 3.5 $MgCl_2$, and 0.0285% Ag, respectively, based on the weight of the ZnS and dried. The mixture was fired at 1050° C. for 1 hr. The inert, and green-emitting parts were removed from the surface leaving the blue-emitting phosphor. Part of the phosphor was ground in a mortar and then refired in a nitrogen atmosphere for 45 minutes at 900° C. It was then washed by slurrying with 0.12 N HCl, filtered, and washed on the filter with pure water. After drying, 28.6% of the sample did not pass through a 325-mesh sieve. The sieved portion contained large particles and many fused aggregates. Another part of the blue-emitting phosphor was ground in a mortar, washed with 0.12 N HCl and with water as described above, dried, and sieved. Only 1.6% of the phosphor did not pass through the 325-mesh sieve. The phosphor was then recalcined in a nitrogen atmosphere for 45 minutes at 900° C. and sieved. All of the phosphor passed through the 325-mesh sieve and the powder was quite free of aggregates. The recalcining after washing does not cause excessive particle size growth and aggregation which result in loss of phosphor and poor screening properties.

EXAMPLE IV

A blue-emitting phosphor with light gray body color was prepared as described in Example I. The phosphor was put in a covered quartz crucible, placed inside a larger crucible which was then filled with previously fired zinc sulfide and covered. The crucible was placed in a furnace and the phosphor recalcined for 45 minutes at 900° C., after which it was removed from the hot furnace and allowed to cool. After the recalcination, the reflectance at 450 m$\mu$ was 95.4% and the relative luminescence on the same scale used in Example I was 150. Thus it is seen that the nitrogen atmosphere is not essential to the recalcination.

EXAMPLE V

A blue-emitting phosphor with light gray body color was prepared as described in Example I. The body color of one portion was improved by washing with aqueous KCN in a known manner. A second portion was recalcined at 900° C. as described in Example I. Both portions were then essentially white in body color. The emission spectrum of the phosphors was obtained and the results, expressed as the trichromatic coefficients $x$ and $y$ according to the International Commission on Illumination (I.C.I.) system, are given in Table 3.

Table 3

| Treatment | Trichromatic Coefficients | |
| --- | --- | --- |
|  | $x$ | $y$ |
| Recalcined | 0.157 | 0.077 |
| Washed with KCN | 0.158 | 0.093 |

The smaller value of the $y$ indicates that the emission color was made bluer by the recalcination. These results show that the recalcination incorporates surface silver into the phosphor lattice as an activator rather than removing it as is done with the cyanide wash.

EXAMPLE VI

An orange-emitting phosphor was prepared by firing ZnS with 1% Mn added as $MnCl_2$, 3.9% $MgCl_2$, and 3.6% $BaCl_2$ at 950° C. for 5 hours. The phosphor was washed by slurrying with 0.3 N HCl, filtered, and washed on the filter with pure water. The resultant grayish pink colored phosphor was dried and sieved. A portion of the phosphor powder was then recalcined as described in Example I at 900° C. The body color after recalcining was less gray as indicated by the fact that the reflectance at 500 m$\mu$ was increased from 66.8% to 73.1%.

EXAMPLE VII

A green-emitting phosphor was prepared by firing ZnS with 0.032% Cu added as copper acetate, 3.5% $MgCl_2$, and 3.5% $BaCl_2$ at 900° C. for 1.5 hours. The phosphor was then washed by slurrying with water, decanted, reslurried with water, filtered, and washed twice on the filter with water. The reflectance of the dried phosphor at 450 m$\mu$ was 64.4%. A portion of the phosphor was then recalcined for 1 hour at 900° C. in a crucible which was placed inside a larger crucible filled with ZnS. The reflectance at 450 m$\mu$ was thereby increased to 75%.

EXAMPLE VIII

Pure zinc sulfide of phosphor grade was slurried with aqueous solutions of NaCl and $AgNO_3$ equivalent to 9% by weight NaCl and 0.030% Ag, respectively, based on weight of the zinc sulfide, and dried. The mixture was ground in a mortar and fired for 1 hour at 950° C. in a covered crucible, placed inside a larger crucible which was then filled with previously fired zinc sulfide and covered. After cooling, the calcine was washed by slurrying in water (2 mls. per gram of phosphor), decanted, reslurried, filtered and washed twice on the filter with water. The dried phosphor emitted blue light under 3650 A. excitation. A portion of the phosphor was then recalcined at 950° C. for 1 hour in a double crucible, as described in Example VII and sieved. The results are shown in Table 4 where body color and reflectance are given as in Example 1.

Table 4

|  | Percent Reflectance at 450 m$\mu$ | Relative Luminescence |
| --- | --- | --- |
| Before recalcination | 57.5 | 100 |
| After recalcination | 89.1 | 165 |

This example shows that recalcination of ZnS phosphors fluxed with either NaCl (alkali halide) or $MgCl_2$-$BaCl_2$ (alkaline earth halide) may be employed.

The improved phosphors of the instant invention are zinc sulfide phosphors particularly zinc sulfide phosphors activated with silver. Good results are obtained with the use of other activators, i.e., copper and manganese or combinations.

The phosphors can be calcined and washed by methods known in the art, dried and sieved. The wash procedures employed may at some point include an acid or a base to aid in dissolving soluble flux material or oxides but will be primarily a water wash. Thus acids, e.g., hydrochloric, dilute acetic, sulfuric and sulfurous acids and bases, e.g., barium, sodium and potassium hydroxides are useful in the aqueous wash solution to free the phosphor of soluble compounds in a more efficient manner than water alone. Combinations of acids and bases, i.e., salt solutions, can also be used. Such wash solutions are usually followed by washing with water. The recalcination may be carried out at a temperature within the range of from 500° to 1000° C., preferably 900° C. Zinc sulfide phosphors originally fired at temperatures above 1050° C. will tend to be hexagonal rather than cubic and the recalcination should, therefore, be carried out at about the same temperature as that of the original calcination to avoid changing the crystal structure. Temperatures as high as about 1300° C., therefore, are useful in the recalcination. The recalcination is effective even when used for periods as short as 2 minutes. In general, the recalcination is continued for several hours, up to about 20 hours. Forty-five minutes is a practical recalcination period.

The atmosphere during recalcination may be nitrogen, or other inert gas or any usual firing atmosphere satisfactory for the original firing or calcination of the zinc sulfide phosphor. On a small scale, recalcining in a crucible placed inside a larger crucible which is then filled with zinc sulfide is satisfactory. On a larger scale, no special zinc sulfide protective layer is necessary since any oxidized or inert material near the surface can be scraped off and discarded.

The improved luminescent phosphors prepared according to the invention are useful in the manufacture of cathode-ray tube screens or whenever appearance, uniformity, reflectance, and emission brightness of a phosphor are of great importance. Both black-and-white and color television screens made from the improved phosphors have enhanced properties. Other uses for the improved phosphors obtained in accordance with the invention include fluoroscopic screens, X-ray intensifying screens, miniature radiographic screens, screens for electron microscopy, and oscilloscopes, radar screens, etc.

An advantage of the invention is that it provides a simple and dependable method for improving the body color of phosphors. As a result the phosphor luminescence is also improved. Since the emission color in the case of silver activated phosphors is made bluer by the recalcination, deep blue emitting phosphors which are desirable in color television can be readily prepared.

As many apparently widely different embodiments of this invention may be made without departing from the spirit and scope thereof, it is to be understood that this invention is not limited to the specific embodiments thereof except as defined in the appended claims.

What is claimed is:

1. In a method for improving the properties of zinc sulfide phosphor particles activated with a metal selected from the group consisting of silver, copper and manganese, having been previously calcined in the presence of a halide flux, the steps which comprise washing the phosphor particles free of said flux with water and recalcining the washed phosphors at a temperature from 500° C. to 1300° C. for a period of from 2 to 1200 minutes.

2. In a method for improving the properties of zinc sulfide phosphor particles activated with a metal selected from the group consisting of silver, copper and manganese, having been previously calcined in the presence of a halide flux, the steps which comprise washing the phosphor particles free from said flux with water and recalcining the washed phosphors at a temperature of from 500° C. to 1000° C. for a period of from 2 to 60 minutes.

3. The method according to claim 2 wherein the zinc sulfide phosphor is silver activated.

4. The method according to claim 2 wherein the halide flux is selected from the group consisting of alkali and alkaline earth metal halides.

5. In a method for improving the properties of silver activated zinc sulfide phosphor particles having been previously calcined in the presence of an alkaline earth metal halide flux, the steps which comprise washing the phosphor particles free from said flux with water and recalcining the washed phosphor at a temperature of from 500° to 1000° C. for a period of from 2 to 60 minutes.

References Cited in the file of this patent

UNITED STATES PATENTS

| 2,126,233 | Wakenhut | Aug. 9, 1938 |
| 2,421,207 | Leverenz | May 27, 1947 |
| 2,546,239 | Rothschild | Mar. 27, 1951 |
| 2,615,849 | Markoski | Oct. 28, 1952 |
| 2,745,811 | Butler | May 15, 1956 |
| 2,755,255 | Beutler | July 17, 1956 |

FOREIGN PATENTS

| 718,804 | Great Britain | Nov. 17, 1954 |
| 782,095 | Great Britain | Sept. 4, 1957 |